United States Patent [19]

Dorn et al.

[11] Patent Number: 4,743,671
[45] Date of Patent: May 10, 1988

[54] PROCESS AND AGENT FOR CROSS-LINKING ORGANOPOLYSILOXANES

[75] Inventors: Maximilian Dorn, Pullach; Erwin Rossberger, Grossdingharting; Josef Weinmaier, Pullach; Eberhard Hägel, Icking, all of Fed. Rep. of Germany

[73] Assignee: Peroxid-Chemie GmbH, Hoellriegelskreuth, Fed. Rep. of Germany

[21] Appl. No.: 12,989

[22] Filed: Feb. 10, 1987

[30] Foreign Application Priority Data

Feb. 10, 1986 [DE] Fed. Rep. of Germany ....... 3604174
Oct. 7, 1986 [DE] Fed. Rep. of Germany ....... 3634171

[51] Int. Cl.$^4$ ............................................. C08G 77/06
[52] U.S. Cl. ..................... 528/24; 502/160; 528/32; 528/43
[58] Field of Search ............... 502/160; 528/24, 43, 528/32

[56] References Cited

U.S. PATENT DOCUMENTS

| | | | |
|---|---|---|---|
| 3,183,206 | 5/1965 | Kniege et al. | 502/160 |
| 3,231,542 | 1/1966 | Eisinger et al. | 528/24 |
| 4,202,790 | 5/1980 | Stellar | 502/160 |
| 4,560,495 | 12/1985 | Kato | 502/160 |
| 4,647,641 | 3/1987 | Westbrook | 528/24 |

OTHER PUBLICATIONS

Ullmann's Encyklopädie der technischen Chemie, vol. 21, 1982.

Primary Examiner—Melvyn I. Marquis
Attorney, Agent, or Firm—Felfe & Lynch

[57] ABSTRACT

The present invention provides a process for cross-linking organopolysiloxanes by means of a bis-benzoyl peroxide derivative with heating, wherein, as bis-benzoyl peroxide derivative, there is used at least one compound of the general formula:

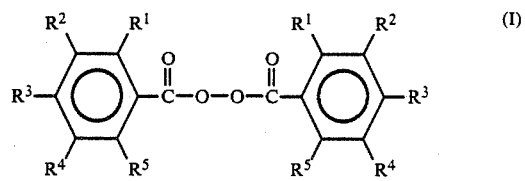

in which the symbols $R^1$, $R^2$, $R^3$, $R^4$ and $R^5$, each independently of one another, have the following meanings: $R^1$ and $R^5$ are the same or different and signify alkoxycarbonyl radicals with 2 to 4 carbon atoms in the alkyl moiety or fluorine or hydrogen atoms, $R^2$ and $R^4$ are the same or different and signify alkyl radicals with 2 to 8 carbon atoms or hydrogen atoms and $R^3$ signifies an alkyl radical with 1 to 8 carbon atoms or a hydrogen atom, at least 2 symbols and at most 4 symbols per benzene ring signifying hydrogen atoms.

The present invention also provides an agent for carrying out this process which consists essentially of silicone oil in which is contained, in finely divided form, 10 to 80% by weight of at least one compound of general formula (I).

17 Claims, No Drawings

PROCESS AND AGENT FOR CROSS-LINKING ORGANOPOLYSILOXANES

BACKGROUND OF THE INVENTION

The present invention is in a process and an agent for the cross-linking of organopolysiloxanes.

Depending upon the degree of polymerisation, organopolysiloxanes, either in the form of oils or as plastic solid masses in the form of silicone rubber, can be made up of siloxane chains with alkyl or aryl substituents R, such as methyl, phenyl or vinyl, on the silicon atom according to the following structural formula

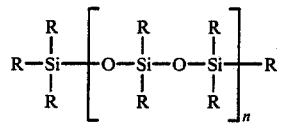

The hydrogen atoms in the alkyl substituents can also be replaced wholly or partly by fluorine or chlorine atoms in order to achieve special chemical properties. As a rule, silicone rubber contains 1 to 10 vinyl radicals per 1000 silicon atoms.

These silicone rubbers are sometimes provided with pigments or filling materials in order to influence their color and strength. However, silicone products with a high transparency and without impurities and colorations are usually desired, particularly for medical and foodstuff use in tubes, seals, profiles, foils and the like.

For the production of these products, continuous processes are usually employed and vulcanisation is preferably carried out in an infra-red hot canal at 150° to 600° C. without pressure and in the presence of air.

For this use, industrial chlorinated bis-benzoyl peroxides, such as bis-(2,4-dichlorobenzoyl)peroxide, have hitherto proved useful as cross-linking agents. However, this compound gives rise to hazardous decomposition products of the polychlorinated biphenyl (PCB) type. Other peroxides, for example dicumyl peroxide, cannot be used since they give rise to bubbles in the vulcanisate, discolorations of the desired transparent article or also a drastic reduction of the productivity due to too slow decomposition.

After vulcanisation, the silicone rubber products are normally subjected to treatment with hot air at 150° to 250° C. for several hours in order to free them from volatile products of the siloxane production process and of the peroxide decomposition. Furthermore, the optimum mechanical properties (tensile strength, E-module, hardness, compression set) are only achieved after this treatment. However, in the case of this tempering, the silicone article must not become discolored.

Because of the increased official requirements in the case of the use of chlorinated aromatics, there is an urgent need for a replacement for bis-(2,4-dichlorobenzoyl)peroxide in the case of the use of which the chlorinated decomposition products of the latter, such as 2,4-dichlorobenzoic acid and especially 2,4-dichlorobenzene and bis-(2,4-dichlorophenyl) cannot arise (Rubber World, August, 1985, p. 12 et seq.).

Therefore, it is an object of the present invention to find an appropriate chlorine-free organic peroxide, especially for the pressureless vulcanisation of silicone rubber, which does not suffer from the disadvantages of the chlorinated peroxides.

Benzoyl peroxide itself is unsuitable since it produces bubbly vulcanisates when pressure is not used.

Furthermore, the sought after peroxide should also fulfil the following conditions:

- be storage-stable up to +30° C. for several months (preferably 3 to 6),
- be miscible in silicone oil in a concentration of from 10 to 80%,
- give decomposition products which can be removed by tempering for several hours with hot air at 150° to 250° C. without discoloration of the vulcanisate, not losing its white color in silicone paste form during the storage since the vulcanisate then also becomes discoloured,
- display a self-decomposition temperature which is so high that official requirements do not make necessary a storage and transport with cooling.

SUMMARY OF THE INVENTION

Thus, according to the present invention, there is provided a process for cross-linking organopolysiloxanes by means of a bis-benzoyl peroxide derivative with heating, wherein, as bis-benzoyl peroxide derivative, there is used at least one compound of the general formula:

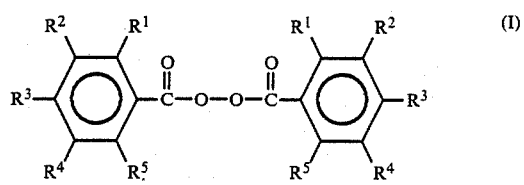

in which the symbols $R^1$, $R^2$, $R^3$, $R^4$ and $R^5$, each independently of one another, have the following meanings: $R^1$ and $R^5$ are the same or different and signify alkoxycarbonyl radicals with 2 to 4 carbon atoms in the alkyl moiety or fluorine or hydrogen atoms, $R^2$ and $R^4$ are the same or different and signify alkyl radicals with 2 to 8 carbon atoms or hydrogen atoms and $R^3$ signifies an alkyl radical with 1 to 8 carbon atoms or a hydrogen atom, at least 2 symbols and at most 4 symbols per benzene ring signifying hydrogen atoms.

The alkyl radicals in the compounds of general formula (I) can be straight-chained, branched or cyclic.

Surprisingly, we have found that, with the above-defined peroxides, all the above-mentioned conditions can be fulfilled although bis-benzoyl peroxides alkyl-substituted in ortho-position, such as bis-(2-methylbenzoyl)peroxide, have an insufficient storage stability and give rise to discolored vulcanisates.

The process according to the present invention can be used not only for pressureless cross-linking but also for cross-linking carried out under pressure. However, it is of especial value for pressureless cross-linking. According to the present invention, this can be carried out at a temperature of from about 100° to about 600° C., preferably in the presence of oxygen and especially of air. Cross-linking preferably takes place at a temperature of from 150° to 350° C., for example with hot air.

DESCRIPTION OF A PREFERRED EMBODIMENT

The compounds of general formula (I) used according to the present invention, in which $R^1$ and $R^5$ each signify a hydrogen atom, can be prepared, for example, by reaction of the appropriate acid chlorides with hydrogen peroxide in an alkaline medium. Some of them are known and they are preferably used dispersed in silicone oil and admixed in this form with the organopolysiloxane to be cross-linked since an especially good and uniform distribution of the peroxide in the siloxane to be cross-linked is thereby achieved. In order to assist this effect, the peroxide is preferably dispersed in a particle size below 50 μm, especially preferably in a particle size of 1 to 20 μm.

The production of the silicone oil dispersions of the compounds used according to the present invention of general formula (I), wherein $R^1$ and $R^5$ each signify a hydrogen atom, can take place in the manner described in Federal Republic of Germany Patent Specifications Nos. 12 56 644 and 17 68 199, the final peroxide being dispersed with the silicone oil in water and the product thereby formed, which is present as a powder or granulate, is separated off or the corresponding benzoyl chloride is produced with hydrogen peroxide in an alkaline medium in the presence of the silicone oil and the dispersion so formed is freed from water.

The compounds of general formula (I) used according to the present invention, in which $R^1$ and/or $R^5$ are carboxyalkyl radicals, can be prepared, for example, by reacting the corresponding phthalic acid alkyl ester chloride with hydrogen peroxide in an alkaline medium. After drying and recrystallising, these compounds can then be preferably admixed with silicone oil and homogenized and then used in this form for the cross-linking.

In the preferred silicone oil dispersions, the peroxide used according to the present invention is present in an amount of from 10 to 80% by weight.

As peroxide of general formula (I), there is preferably used a compound in which the symbols $R^1$ and $R^5$ signify hydrogen atoms, $R^2$ and/or $R^4$ each signify an alkyl radical with 2 to 4 carbon atoms and/or the symbols $R^3$ signify alkyl radicals with 1 to 4 carbon atoms. Especially preferred compounds of general formula (I) are those in which $R^1$, $R^2$, $R^4$ and $R^5$ signify hydrogen atoms and $R^3$ a methyl, ethyl, propyl, butyl radical and/or an isomer thereof, bis-(4-methylbenzoyl)peroxide and/or bis-(4-tert.-butylbenzoyl)peroxide being especially preferred.

The amount of peroxide in each case suitable can easily be ascertained by a few simple preliminary experiments. In general, 0.5 to 5 mmole of a compound of general formula (I) are added per 100 g. of organopolysiloxane to be cross-linked.

After vulcanisation and tempering, the silicone rubber displays a high ageing resistance, transparency and good mechanical strength. The tensile strength is, in particular, dependent upon the rubber type. However, a high tensile strength also results from a uniform admixing of the peroxide. In the case of high degrees of cross-linking, premature breakage occurs so that low tensile strength values result (embrittlement).

A high degree of cross-linking manifests itself in the magnitude of the torque increase in the case of rheometer testing, as well as in the modulus (N/mm²), for example at 400%. The degree of cross-linking depends upon the peroxide type and upon active oxygen or molar dosed amount of peroxide. In order to compare peroxides according to their action, molar dosing is needed.

The present invention also provides an agent for carrying out the process, wherein it consists essentially of silicone oil in which is contained, in finely divided form, 10 to 80% by weight of at least one compound of general formula (I).

By means of the present invention, there can be achieved an excellent cross-linking of organopolysiloxanes without yellowing and without formation of undesired decomposition products and, even in the case of pressureless working, no bubble formation occurs.

The following Examples are given for the purpose of illustrating the present invention:

EXAMPLE 1

Di-(p-methylbenzoyl)peroxide-silicone paste

To a mixture of 1000 g. hydrogen peroxide (content: 35%, 10.3 mole), 2360 g. aqueous sodium hydroxide solution (content: 25%, 14.8 mole), 10 kg. water, 620 g. silicone oil and 7 ml. wetting agent are added, with cooling and strong stirring, 2000 g. p-methylbenzoyl chloride (12.9 mole). The addition time is 30 minutes and the temperature is 10° to 20° C. After further stirring for half an hour, the reaction product is washed several times and mixed with a further 1080 g. of silicone oil. The pasty product is subsequently dried. Yield: 3400 g.; peroxide content: 49.0%. Referred to the amount of acid chloride used, this amount corresponds to a yield of 95%.

EXAMPLE 2

Di-(p-tert-butylbenzoyl)peroxide-silicone paste

To a mixture of 666 g. hydrogen peroxide (content: 35%, 6.9 mole), 1572 g. aqueous sodium hydroxide solution (content: 25%, 9.8 mole), 3 kg. water, 480 g. silicone oil and 5 ml. wetting agent are added, with cooling and strong stirring, 1500 g. p-tert.-butylbenzoyl chloride (7.6 mole) within the course of 20 minutes, the reaction temperature being 10° to 15° C. The reaction mixture is further stirred at this temperature for 30 minutes. After repeated washing, a further 770 g. of silicone oil are added thereto. The product obtained is subsequently dried. Yield: 2550 g.; peroxide content: 50.7%. Referred to the amount of acid chloride used, this corresponds to a yield of 96%.

EXAMPLE 3

Bis-(o-carboethoxy)-benzoyl peroxide-silicone paste

To a solution, cooled to 0° to 5° C., of 3060 g. 10% aqueous sodium hydroxide solution (7.7 mole) and 138 g. 70% hydrogen peroxide there is added, with strong stirring, a solution of 1063 g. phthalic acid ethyl ester chloride (5.0 mole) and 90 g. benzine (30/85). The addition time is 1.5 hours and the temperature of the reaction mixture is not to exceed 5° C. After completion of the addition, stirring is continued at this temperature for a further half an hour. The resultant precipitate is filtered off, washed free of acid and dried. After recrystallisation from as little ethanol as possible (up to 40° C.), bis-(o-carboethoxy)benzoyl peroxide is obtained as a colorless solid material the weight of which, after drying, is 690 g. Its iodometrically determined peroxide content is 100%, which, referred to the amount of acid chloride used, corresponds to a yield of 78%. The total amount of peroxide is mixed with 630 g. of silicone oil and homogenised on a two roll mill. The end product is a colorless, homogeneous silicone paste with a peroxide content of 52.0%.

EXAMPLE 4

Bis-(o-carbo-n-butoxy)-benzoyl peroxide-silicone paste

Amounts used:

| | |
|---|---|
| phthalic acid n-butyl ester chloride | 2000 g. = 8.3 mole |
| 10% aqueous sodium hydroxide solution | 6647 g. = 16.6 mole |
| 70% hydrogen peroxide | 242 g. = 5.0 mole |
| benzine (30/85) | 188 g. |

The process is carried out analogously to Example 1. Yield: 1395 g. colorless bis-(o-carbo-n-butoxy)benzoyl peroxide with an iodometrically determined content of 100%.

After mixing with 1375 g. silicone oil and subsequent homogenisation on a roller frame, there is obtained a colorless, homogeneous silicone paste with a content of 50.4%.

EXAMPLE 5

In the following Table 1, there are compared the properties of pastes of peroxides in silicone oil. In this Table:

| peroxide | | |
|---|---|---|
| I | comparison | di-(2-methoxybenzoyl) peroxide |
| II | " | di-(2-methylbenzoyl) peroxide |
| III | according to the invention | di-(4-methylbenzoyl) peroxide (Example 1) |
| IV | according to the invention | di-(4-butylbenzoyl) peroxide (Example 2) |
| V | comparison | dibenzoyl peroxide |
| VI | " | di-(2,4-dichlorobenzoyl) peroxide |
| VII | " | di-(2-ethoxycarbonylbenzoyl) peroxide |
| VIII | " | di-(2n-butoxycarbonylbenzoyl) peroxide |
| IX | " | di-(2-fluorobenzoyl) peroxide |

Test (A) Grind-o-meter+
(B) storage stability at 30° C./peroxide content after 10 weeks
(C) discoloration after storing for 10 weeks at 30° C.
(D) storage stability of a mixture of 2 mmole peroxide in 100 g. silicone rubber
  1. viscosity after 10 weeks at 23° C.
  2. discoloration after 10 weeks at 23° C.
(E) self-decomposition temperature (SADT)

+the particle sizes measured with the Grind-o-meter refer to agglomerates of particles stuck together. The size of the individual particles is determined under the microscope as 1 to 20 μm.

TABLE 1

| peroxide | peroxide content % | M.W. g | peroxide amount g. | test A | test B decrease | test C | test D 1 | test D 2 | test E °C. |
|---|---|---|---|---|---|---|---|---|---|
| I | 40.4 | 302.0 | 1.4 | 40–50 | decomposition | yellow | increases | yellow | 25 |
| II | 50.9 | 270.3 | 1.05 | 40–50 | decreasing | yellow | increases | yellow | 40 |
| III* | 49.7 | 270.2 | 1.09 | 40–50 | constant | white | constant | white | 80 |
| IV* | 49.7 | 354.4 | 1.36 | 30–40 | " | white | " | white | 80 |
| V | 50.0 | 242.2 | 1.0 | 20–30 | " | white | " | white | 70 |
| VI | 50.0 | 380.0 | 1.5 | 10 | " | white | " | white | 60 |
| VII | 52.0 | 368.4 | 1.5 | 30–40 | " | " | " | " | 50 |
| VIII | 50.0 | 442.5 | 1.65 | 30–40 | " | " | " | " | 50 |
| IX | 53.1 | 268.3 | 1.0 | 30–40 | " | " | " | " | 50 |

*according to invention

EXAMPLE 6

Pressureless vulcanisation of silicone rubber (vinyl group-containing polysiloxane of the firm Wacker) R 401/60 U with 2 mmole peroxide (100 g. silicone rubber) at 230° C. for 15 minutes with hot air. The peroxides are mixed in a two roll mill. The roller skin is rolled bubble-free and formed in a press into a plate. After vulcanisation, it is further tempered for 3 hours at 230° C. with hot air. The vulcanisates are tested for freedom from bubbles and discoloration. The following Table 2 shows the results obtained.

TABLE 2

| peroxide paste type | content wt. % peroxide | amount 2 mmole/ g. | freedom from bubbles | discoloration |
|---|---|---|---|---|
| I | 40.4 | 1.40 | bubbly | yellow-brown |
| II | 50.9 | 1.05 | + | yellow |
| III* | 49.7 | 1.09 | + | + |
| IV* | 49.7 | 1.36 | + | + |
| V | 50.0 | 1.0 | bubbly | + |
| VI | 50.0 | 1.5 | + | + |
| VII* | 52.0 | 1.40 | + | + |
| VIII* | 50.0 | 1.65 | + | + |
| IX* | 53.1 | 1.0 | + | + |

+ = good
* = according to the present invention

In the case of all vulcanisates, decomposition products can no longer be ascertained (odor, stickiness and bleeding out).

EXAMPLE 7

Vulcanisation of silicone rubber under pressure: in each case, an amount of peroxide corresponding to 2 mmole (or 1.35 mmole) is mixed at ambient temperature, with the help of a two roll mill, into silicone rubber R 401/60 I of the firm Wacker. Subsequently, the peroxide activity and effectiveness is tested in a Monsanto rheometer 100S and then vulcanised at 130° C. The plates obtained of about 2 mm. thickness are tempered for 3 hours at 230° C. On these plates are measured the following mechanical properties:

(A) tensile strength $N/mm^2$
(B) 400% module $N/mm^2$
(C) elongation %
(D) hardness °Shore A
(E) compression set at 22 h/175° C.
(F) resilience %.

With the Monsanto rheometer 100S, there are obtained measured at 110° C.:

scorch time $t_s$ (min.)
cross-linking time $t_{90}$ (min.)
increase of the torque M (Nm)

The results obtained are given in the following Table 3:

TABLE 3

| peroxide type | active oxygen content % | dose wt. % | Monsanto rheometer 100S | | | tensile test | | | hardness °Shore A | compression set % | resilience % |
|---|---|---|---|---|---|---|---|---|---|---|---|
| | | | ts min. | t90 min. | M Nm | elongation % | module N/mm² | tensile strength N/mm² | | | |
| I | 2.2 | 1.40 | 0.7 | 1.5 | 1.6 | 1110 | 2.2 | 11.4 | 36 | 100 | 31 |
| II | 3.0 | 1.05 | 1.2 | 6.5 | 3.1 | 720 | 4.5 | 10.5 | 46 | 61 | 41 |
| III* | 2.9 | 1.09 | 1.9 | 9.0 | 3.4 | 380 | 6.4 | 6.4 | 47 | 36 | 41 |
| IV* | 2.3 | 1.36 | 2.6 | 9.3 | 3.9 | 470 | 7.0 | 8.6 | 48 | 48 | 42 |
| V | 3.1 | 1.05 | 2.2 | 9.0 | 3.9 | 560 | 7.8 | 11.0 | 51 | 17 | 45 |
| VI | 2.1 | 1.5 | 0.6 | 1.9 | 3.7 | 590 | 6.3 | 10.7 | 48 | 52 | 43 |
| II | 3.0 | 0.70 | 1.7 | 7.1 | 2.5 | 880 | 3.1 | 12.0 | | | |
| III* | 2.9 | 0.73 | 2.3 | 12 | 2.9 | 640 | 4.5 | 9.1 | | | |
| IV* | 2.3 | 0.91 | 3.0 | 11 | 3.6 | 610 | 5.1 | 11.1 | | | |
| VI | 2.1 | 1.0 | 0.9 | 2.5 | 3.1 | 730 | 4.1 | 11.8 | | | |
| VII | 2.14 | 1.40 | 1.8 | 5.5 | 3.2 | 740 | 3.5 | 10.6 | 48 | 24 | 53 |
| VIII | 1.82 | 1.65 | 1.9 | 6.5 | 2.9 | 700 | 4.3 | 10.7 | 50 | 20 | 49 |
| IX | 3.06 | 1.0 | 1.7 | 4.1 | 3.5 | 500 | 5.9 | 8.8 | 48 | 25 | 43 | dosing reduced to 1.35 mmole peroxide/100 g. silicone rubber.
*according to invention The above results show that even with comparatively small amounts of the peroxides III and IV used according to the present invention, better degrees of cross-linking (400% module and torsional moment M) can be achieved. They are equivalent to the known peroxide cross-linkers for silicone rubber (V/VI) in their cross-linking effectiveness. Molar dosed, the peroxides I and II are inferior in their effectiveness.

Furthermore, the peroxides III and IV, in comparison with peroxides I, II and VI, possess a greater certainty of working up (scorch time $t_s$). However, peroxide V, which is equivalent in this regard, cannot be used for pressureless vulcanisation.

It will be understood that the specification and examples are illustrative but not limitative of the present invention and that other embodiments within the spirit and scope of the invention will suggest themselves to those skilled in the art.

We claim:

1. A process for cross-linking an organopolysiloxane comprising: admixing with an organopolysiloxane at least one compound of the general formula

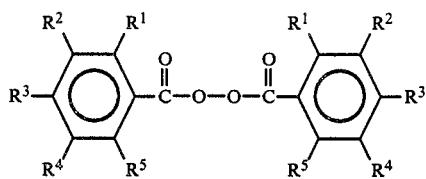

(I)

in which the symbols $R^1$, $R^2$, $R^3$, $R^4$, and $R^5$, each independently of one another, means as follows: $R^1$ and $R^5$ are the same or different and signify alkoxycarbonyl radicals with 2 to 4 carbon atoms in the alkyl moiety, fluorine or hydrogen, $R^2$ and $R^4$ are the same or different and signify alkyl radicals with 2 to 8 carbon atoms or hydrogen, $R^3$ signifies an alkyl radical with 1 to 8 carbon atoms or a hydrogen, at least 2 symbols and at most 4 symbols per benzene ring represent hydrogen atoms; and heating the mixture.

2. The process of claim 1, wherein cross-linking is carried out without application of pressure at a temperature of from 100° to 600° C. in the presence of oxygen.

3. The process of claim 2, wherein air is used as the source of oxygen.

4. The process of claim 2, wherein cross-linking is carried out at a temperature of from 150° to 350° C.

5. The process of claim 1, wherein the compound of general formula (I) is dispersed in silicone oil, and mixed with the organopolysiloxane.

6. The process of claim 5, wherein the compound of general formula (I) is used dispersed in a particle size below 50 μm.

7. The process of claim 5, wherein the silicone oil dispersion contains 10 to 80% by weight of the compound of general formula (I).

8. The process of claim 1, wherein $R^3$ is a methyl, ethyl, propyl, or butyl radical, including the isomers thereof, and $R^1$, $R^2$, $R^4$ and $R^5$ are each hydrogen.

9. The process of claim 1, wherein each $R^1$ is n-butoxycarbonyl or ethoxycarbonyl radical and $R^2$, $R^3$, $R^4$ and $R^5$ are each hydrogen.

10. An agent for carrying out the process of claim 1 comprising: a silicone oil containing in finely divided form, 10 to 80% by weight of at least one compound of the general formula

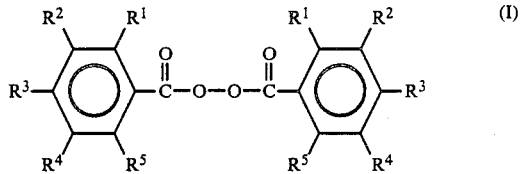

(I)

in which the symbols $R^1$, $R^2$, $R^3$, $R^4$ and $R^5$, each independently of one another, having the following meanings: $R^1$ and $R^5$ are the same or different and signify alkoxycarbonyl radicals with 2 to 4 carbon atoms in the alkyl moiety or fluorine or hydrogen atoms, $R^2$ and $R^4$ are the same or different and signify alkyl radicals with 1 to 8 carbon atoms or hydrogen atoms and $R^3$ signifies an alkyl radical with 1 to 8 carbon atoms or a hydrogen atom, at least 2 and at most 4 symbols per benzene ring signifying hydrogen atoms.

11. The agent of claim 10, wherein the compound of general formula (I) is present with a particle size below 50 μm.

12. The agent of claim 11, wherein the compound of general formula (I) is present with a particle size of from 1 to 20 μm.

13. The process of claim 1, wherein 0.5 to 5 mmole of a compound of general formula (I) is added per 100 g. of the organopolysiloxane.

14. The agent of claim 10, wherein $R^1$ is n-butoxycarbonyl or ethoxycarbonyl radical and $R^2$, $R^3$, $R^4$ and $R^5$ are each hydrogen.

15. The agent of claim 10, wherein $R^3$ is methyl, ethyl, propyl, or butyl radical including the isomers thereof and $R^2$, $R^3$, $R^4$ and $R^5$ are each hydrogen.

16. The process of claim 1, wherein the compound of general formula (I) is selected from the group consisting of bis-(4-methylbenzoyl)peroxide, bis-(4-tert.-butylbenzoyl)peroxide and mixtures thereof.

17. The agent of claim 10, wherein the compound of general formula (I) is selected from the group consisting of bis-(4-methylbenzoyl)peroxide, bis-(4-tert.-butylbenzoyl)peroxide and mixtures thereof.

* * * * *